United States Patent
Soltau

[11] 3,744,464
[45] July 10, 1973

[54] ARRANGEMENT FOR CONTROLLING THE PRESSURE IN THE INLET MANIFOLD OF AN INTERNAL COMBUSTION ENGINE

[75] Inventor: John Peter Soltau, Solihull, Warwickshire, England

[73] Assignee: Joseph Lucas (Industries) Limited, Birmingham, England

[22] Filed: Jan. 21, 1971

[21] Appl. No.: 108,410

[30] Foreign Application Priority Data
Mar. 20, 1970  Great Britain................... 13,694/70

[52] U.S. Cl..... 123/119 D, 123/97 B, 261/DIG. 19, 123/117 A, 123/124
[51] Int. Cl.. F02b 33/00, F02m 23/04, F02d 31/00
[58] Field of Search................... 123/97 B, 117.1, 123/119 D, 124

[56] References Cited
UNITED STATES PATENTS

| | | | |
|---|---|---|---|
| 3,601,108 | 8/1971 | Nambu | 123/119 D |
| 3,590,793 | 7/1971 | Masaki | 123/119 D |
| 3,294,074 | 12/1966 | Mennicken | 123/119 D |
| 3,626,915 | 12/1971 | Nakajima | 123/119 D |
| 3,502,307 | 3/1970 | Thuesen | 123/97 B |
| 3,503,376 | 3/1970 | Walker | 123/97 B |
| 3,426,737 | 2/1969 | Walker | 123/97 B |
| 3,256,870 | 6/1966 | Walker | 123/97 B |
| 3,368,345 | 2/1968 | Walker | 123/97 B |
| 3,447,516 | 6/1969 | Bartholomew | 123/97 B |
| 3,289,659 | 12/1966 | Koole | 123/97 B |
| 3,060,749 | 10/1962 | Bettoni | 123/97 B |

Primary Examiner—Laurence M. Goodridge
Assistant Examiner—Ronald B. Cox
Attorney—Holman & Stern

[57] ABSTRACT

An arrangement for controlling the pressure in the inlet manifold of an internal combustion engine has a speed-responsive valve in a passage communicating with the manifold, and a control device responsive to the pressure downstream of the speed-responsive valve and to the manifold pressure, the arrangements being such that when the engine speed is above a predetermined level and the manifold pressure is below a predetermined level the control device admits additional air to the manifold.

5 Claims, 7 Drawing Figures

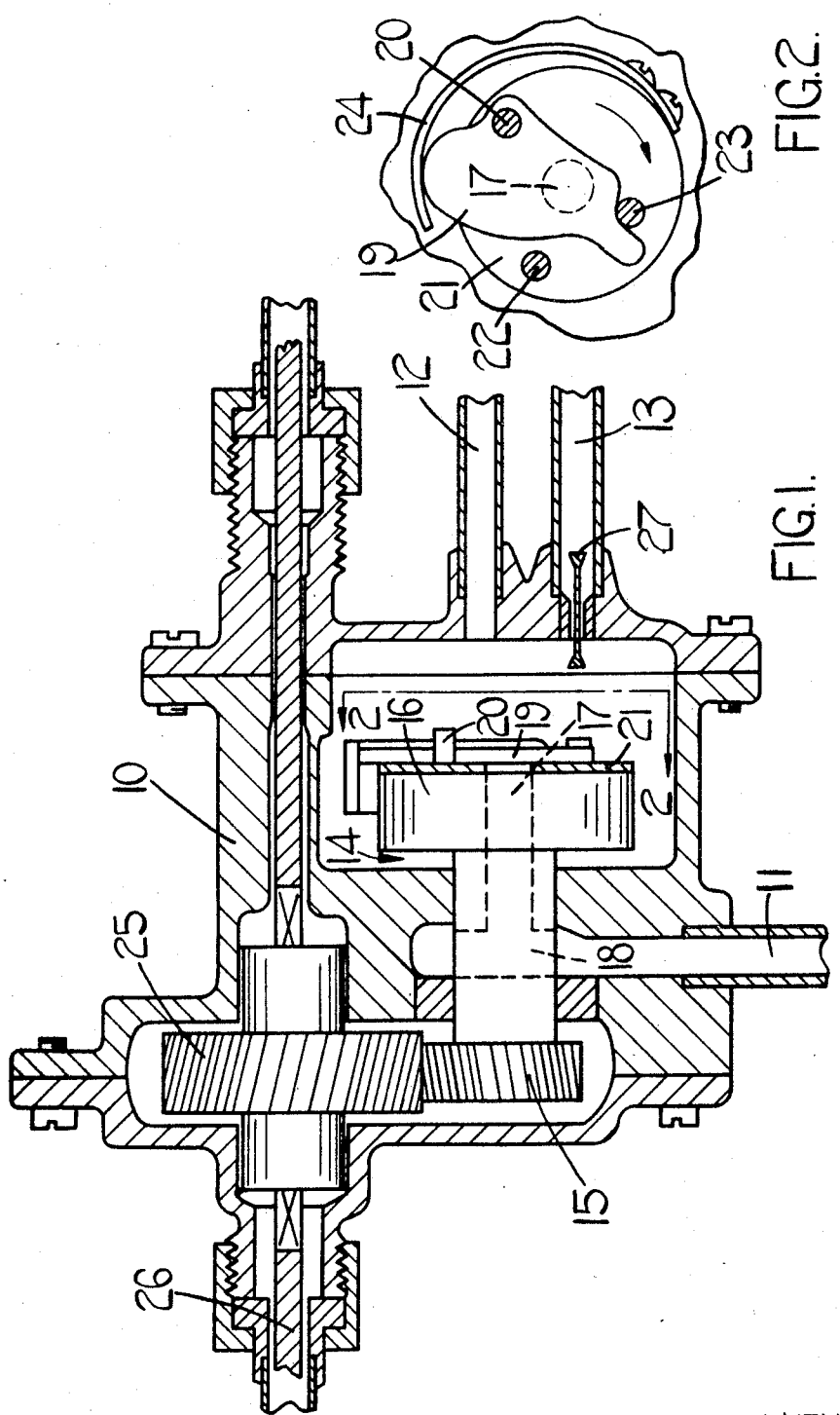

ARRANGEMENT FOR CONTROLLING THE PRESSURE IN THE INLET MANIFOLD OF AN INTERNAL COMBUSTION ENGINE

This invention relates to a speed-responsive valve for controlling the pressure in the inlet manifold of an internal combustion engine, and has as an object to provide such a valve in a convenient form.

According to the invention a valve for controlling the pressure in the inlet manifold of an internal combustion engine comprises a casing having an inlet and an outlet, a member rotatable within the casing a sealingly engaged therewith between the inlet and the outlet, a passage in the said member to permit communication between the inlet and outlet, a closure means for the passage pivotally mounted on said member, biasing means urging the closure means in a direction to shut the valve, the closure means being responsive to centrifugal force to open the valve, and means for rotating the said member at a speed dependent on the speed of the engine.

A valve according to the invention may be incorporated in an arrangement for controlling the pressure in the inlet manifold of an internal combustion engine, the said arrangement comprising an air passage communicating with the said manifold, a valve as above defined in the said passage and a pressure responsive control means communicating with said passage and operable to provide an increased air flow to the manifold, the arrangement being such that when the speed of the said member in the valve is above a predetermined level and the manifold pressure is below a predetermined level the control means is operated to provide the said increased air flow.

In an alternative arrangement for controlling the fuel supply to an internal combustion engine, an intake manifold of the engine communicates via a valve as defined above with a pressure-responsive actuating means, a further valve being operable by the said actuating means, the arrangement being such that, when the speed of the said member in the valve is above a predetermined level and the manifold pressure is below a predetermined level, the said further valve is operated to reduce the amount of fuel supplied to the engine.

Embodiments of the invention will now be described by way of example and with reference to the accompanying drawings in which:

FIG. 1 is a section through a valve;

FIG. 2 is a scrap view on arrows 2—2 in FIG. 1; and

Figure 3:
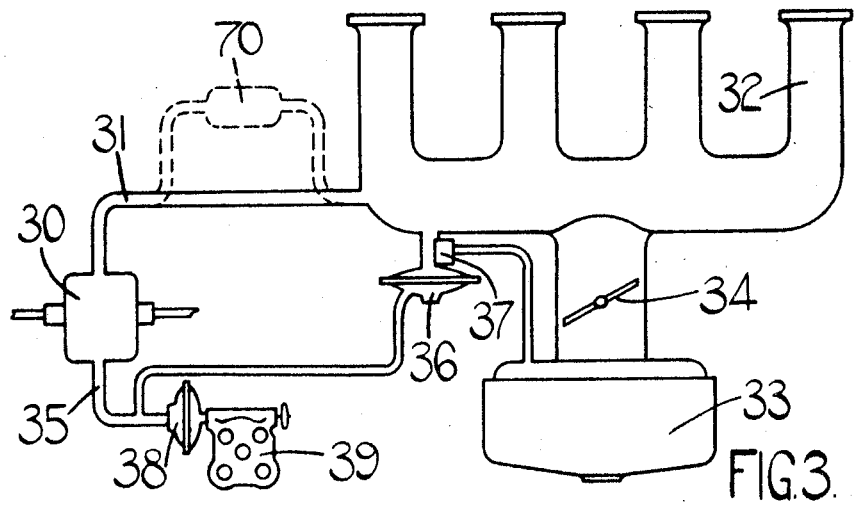
FIGS. 3, 4, 5, 6 and 7 show diagrammatically arrangements incorporating valves according to the invention.

The valve shown in FIGS. 1 and 2 has a casing 10 having an outlet 11, a main inlet 12 and a restricted inlet 13. A captive stem 27 is slidable in the inlet 13 to provide a cleaning action. A member 14 is jounralled in the casing 10 and is formed at its respective ends with a pinion 15 and a flange 16. The member 14 has an axial bore 17 which opens onto the flanged end of the member 14. A transverse passage 18 within the member 14 communicates with the outlet 11 and with the bore 17. A closure member 19 is mounted on a pivot 20 extending from the flange 16. Washer of P.T.F.E. or other anti-friction material 21 is interposed between the flange 16 and the member 19. A pair of pins 22, 23 limit the travel of the member 19 which is biased against the pin 23 by a spring 24.

The pinion 15 is meshed with a spur gear 25, also journalled in the casing. The gear 25 is secured to a flexible drive cable 26. In use the cable 26 is itself driven by the engine or by apparatus operated by the engine, as for example the speedometer cable of a motor vehicle in which the engine is mounted. At a predetermined speed of the member 14 the centrifugal force on the closure member 19 is sufficient to overcome the bias applied by the spring 24 and the member 19 moves to engage the pin 22, opening the valve.

In the arrangement shown in FIG. 3 a valve 30, substantially as previously described, has its outlet 31 connected to an inlet manifold 32 of an internal combustion engine. The manifold 32 is supplied with air via air cleaner 33 and a throttle 34. The main inlet 35 of the valve 30 communicates with a device 36 associated with a valve 37. The valve 37 is situated in a line 38 between the manifold 32 and the air cleaner 33, and the arrangement is such that the valve 37 opens only when the depression in the manifold 32 reaches a predetermined level and also when the manifold depression is applied to the device 36 via the valve 30. The inlet 35 of the valve 30 is also connected to an actuating device 38 adapted to retard the setting of an ignition control means 39.

In use, during deceleration the throttle 34 closes, causing the pressure in the inlet manifold to fall. If the speed of the vehicle, or the speed of the engine as appropriate, is sufficient to open valve 30 and at the same time the depression in the manifold 32 has reached the aforementioned predetermined level, the valve 37 opens to admit additional air from the cleaner 33 to the manifold 32. The manifold depression is thus limited to a desired level, maintaining a burnable air/fuel mixture and thereby substantially reducing the amount of unburnt fuel in the exhaust. Retardation of the ignition by the device 38 also assists in burning the exhaust gases.

The restricted inlet (not shown) of the valve 30 communicates with atmosphere, preferably via the air cleaner 33, whereby atmospheric pressure is presented to the devices 36 and 38 when the valve 30 is shut.

Figure 4:
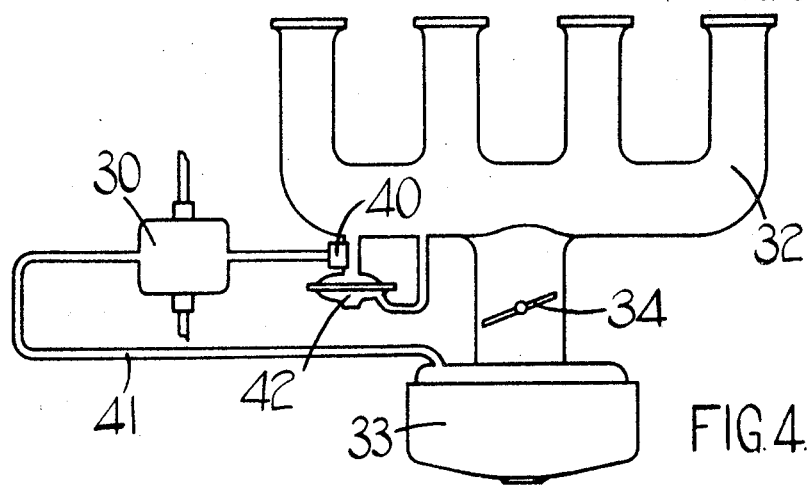

In the arrangement shown in FIG. 4 a valve 30 and a valve 40 are in series in a passage 41 between the manifold 32 and air cleaner 33. A device 42 is associated with the valve 40 and is responsive to the pressure within the manifold 32. The valve 40 and device 42 are essentially the same as the valve 37 and device 36 described with reference to FIG. 3. The apparatus operates to supply additional air to the manifold 32 when the depression therein reaches a predetermined level and when the speed of the engine or vehicle is above a predetermined level.

Figure 5:
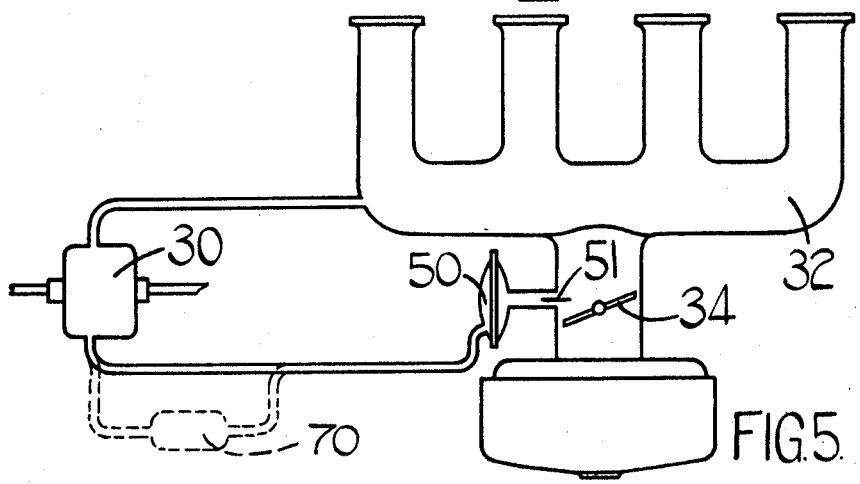

The arrangement shown in FIG. 5 has a valve 30 controlling the application of the depression in the manifold 32 to an actuating device 50. The device 50 in turn controls the position of a stop 51 for the throttle 34, The stop 51 ensures, once again, that the manifold depression does not exceed a desired valve, dependent on engine or vehicle speed.

Figure 6:
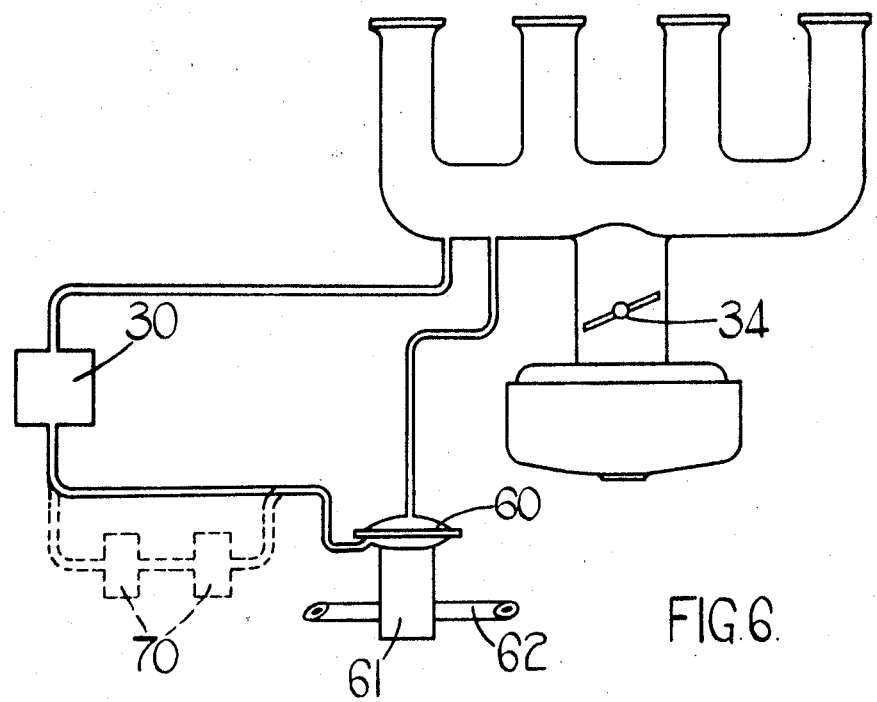

In the arrangement shown in FIG. 6 the valve 30 acts as before, to control application of depression in the manifold 32 to an actuator 60. In this case, however, actuator 60 controls a valve 61 in a fuel line 62 for the engine. During deceleration a burnable mixture or, if required an inert charge, is maintained by reducing or shutting off the fuel flow, instead of increasing the airflow.

Figure 7:
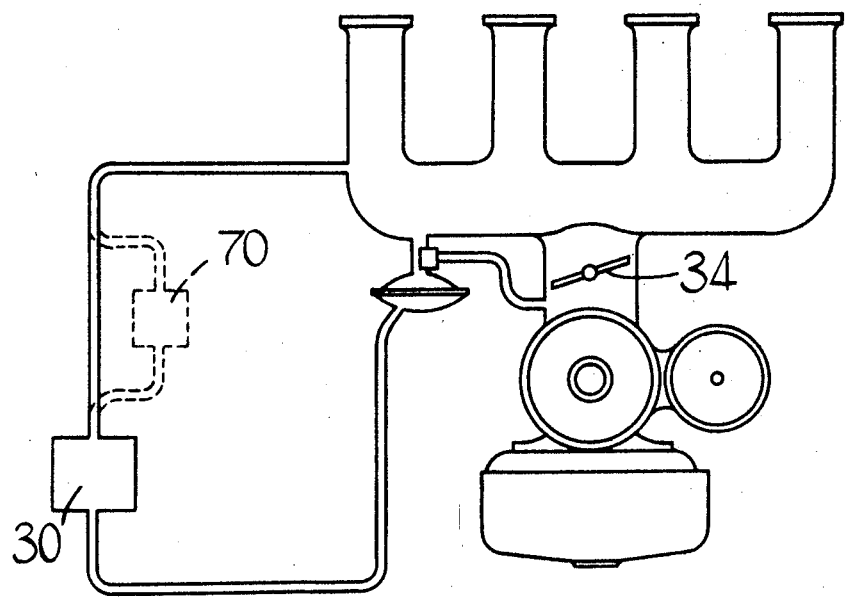

The arrangements described are applicable to both fuel injection systems and carburettor systems. FIG. 7 shows an arrangement generally similar to that described in connection with FIG. 3, but in this case applied to a system having a carburettor.

In any of the arragnements described an additional valve or valves 70 may be introduced in series with the valve 30, the valve 70 being responsive to the position of the engine throttle 34, whereby when the throttle 34 is open the valve 70 is shut and valve 30 is inoperative to alter the air/fuel mixture supplied to the engine.

Having thus described my invention what I claim as new and desire to secure by Letters patent is:

1. An arrangement for controlling the pressure in the inlet manifold of an internal combustion engine, comprising an air passage communicating with said manifold, a valve in said passage, said valve including a casing having an inlet and an outlet, a member rotatable within the casing and sealingly engaged therewith between the inlet and the outlet, a passage in the said member to permit communication between the inlet and outlet, a closure means for the passage pivotally mounted on said member, biasing means urging the closure means in a direction to shut the valve, the closure means being responsive to centrifugal force to open the valve, and means for rotating the said member at a speed dependent on the speed of the engine, and a pressure responsive control means including an actuating means responsive to the pressure at the valve outlet and a further valve operable by the actuating means to admit air to the said manifold, the arrangement being such that, when the speed of said member in the first-mentioned valve is above a predetermined level and the manifold pressure is below a predetermined level, the further valve is operated to increase air flow to the manifold.

2. An arrangement as claimed in claim 1 in which the actuating means is also responsive to the pressure in the manifold.

3. An arrangement as claimed in claim 1 in which the said further valve is arranged to admit air to the inlet manifold directly from a zone upstream of a throttle valve for the engine.

4. An arrangement as claimed in claim 1 which includes valve means in the said passage in series with the first-mentioned valve, the said valve means being responsive to the position of a throttle for the engine.

5. An arrangement as claimed in claim 1 in which the control means comprises a further valve in said passage in series with the first-mentioned valve and actuating means for the further valve responsive to the pressure in the manifold, the end of the passage remote from the manifold communicating with a zone which is upstream of a throttle for the engine.

* * * * *